INVENTOR.
JAMES J. SHANLEY
BY Shanley & O'Neil
ATTORNEYS

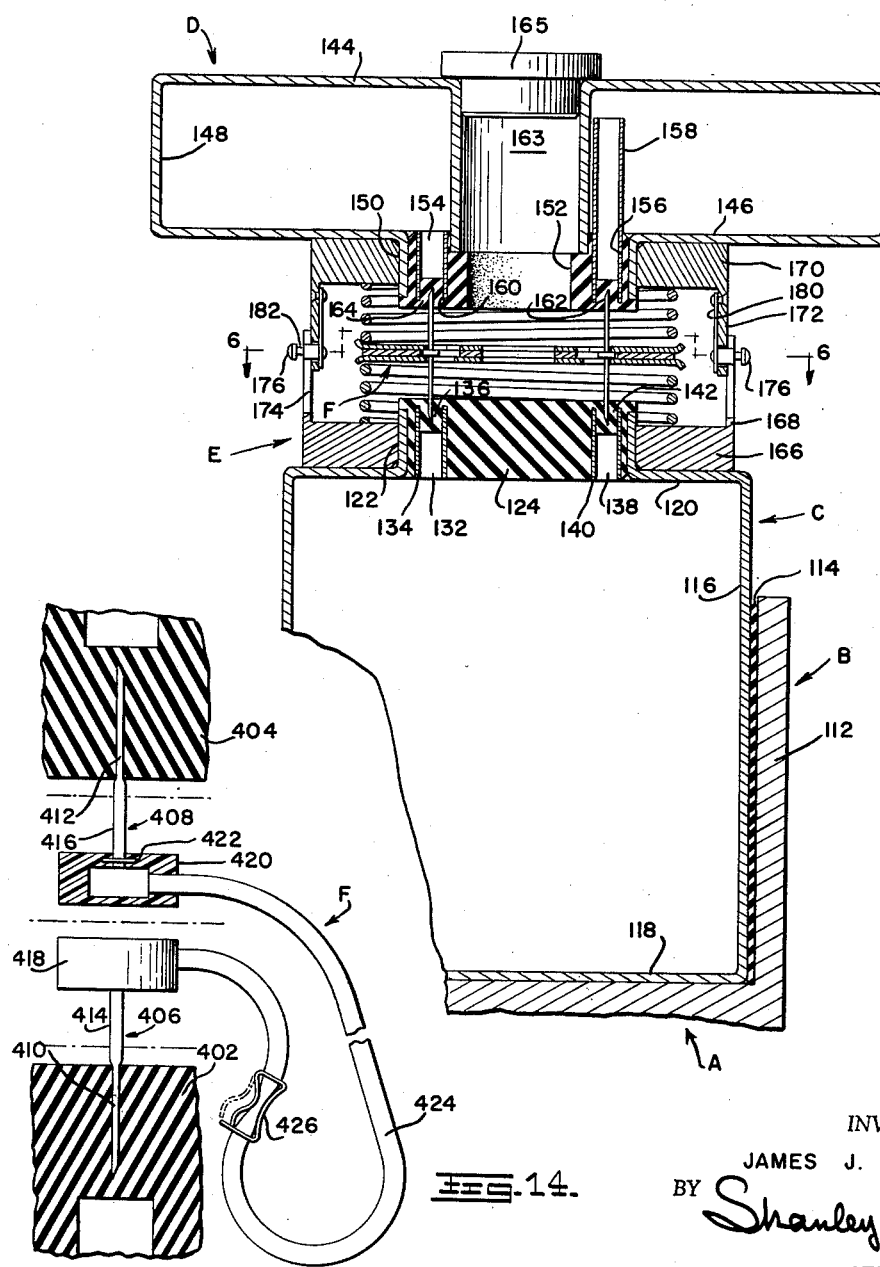

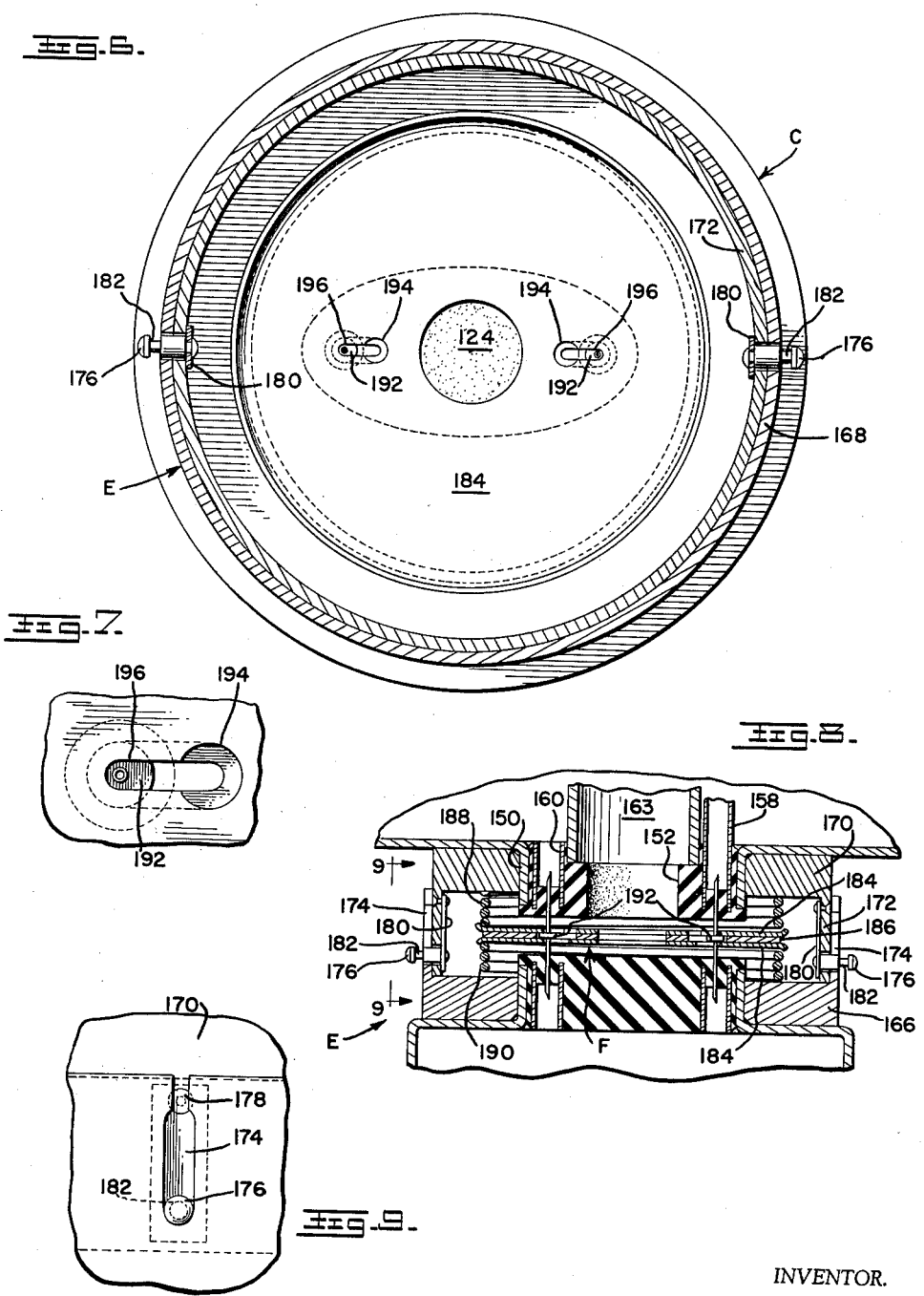

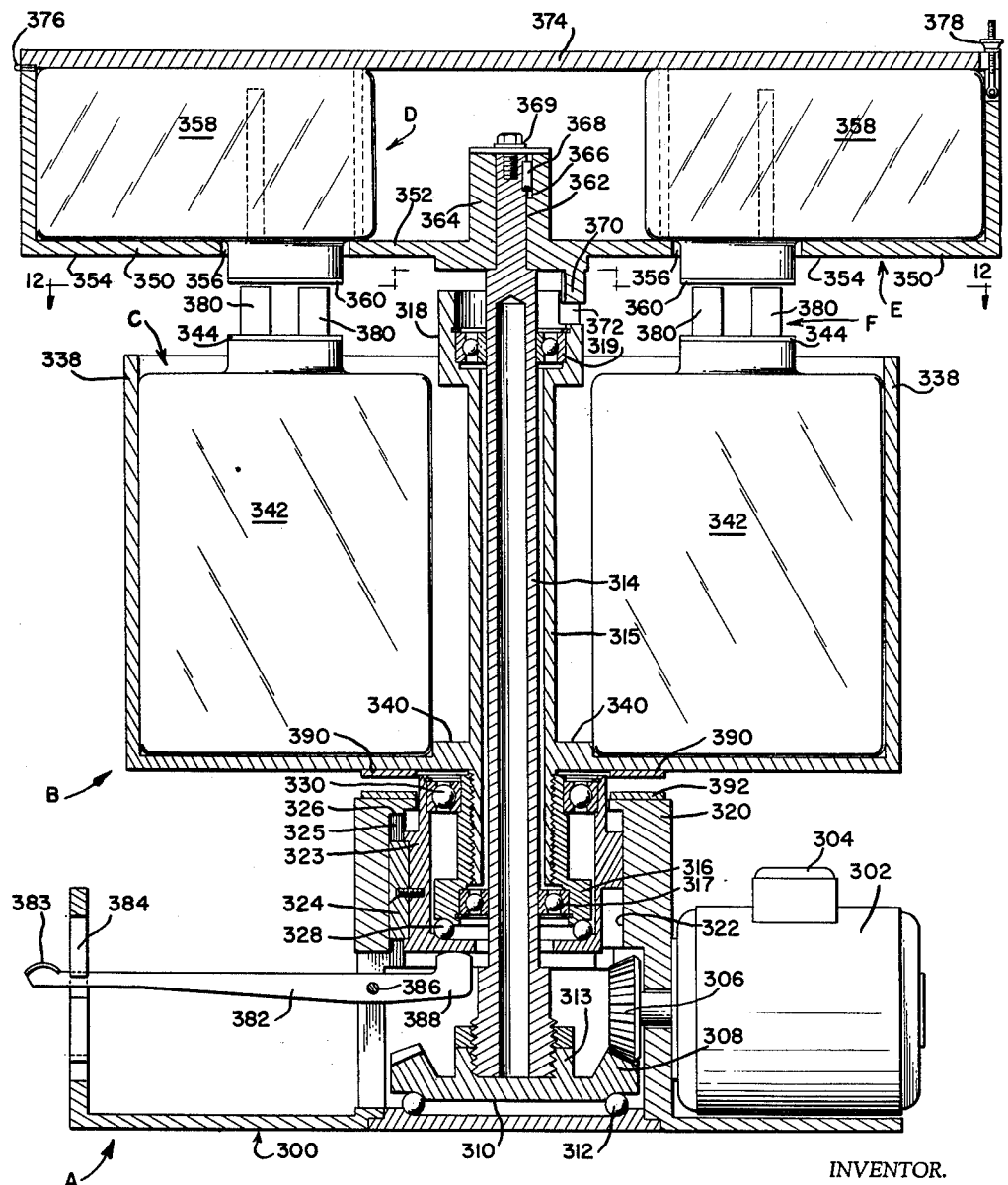

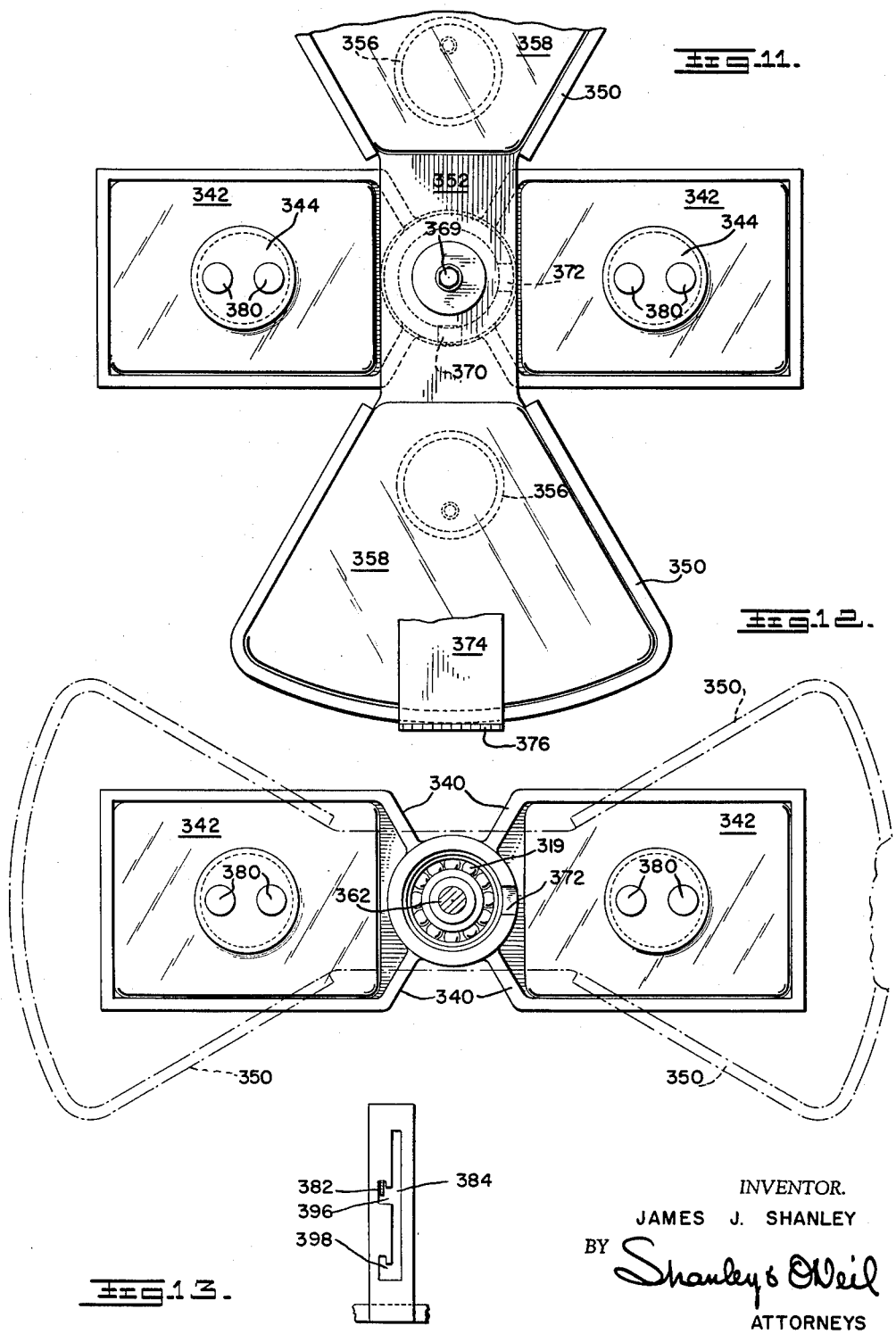

United States Patent Office 3,190,547
Patented June 22, 1965

3,190,547
METHOD AND APPARATUS FOR CENTRIFUGAL-
LY FRACTIONATING LIQUID MIXTURES
James J. Shanley, Bethesda, Md., assignor of one-third to
Giovanni Raccuglia, Prospect, Ky., and one-third to
David L. Childs, Ann Arbor, Mich.
Continuation of application Ser. No. 754,210, Aug. 11,
1958. This application July 29, 1963, Ser. No. 298,818
17 Claims. (Cl. 233—20)

This patent application is a continuation of my copending patent application Serial No. 754,210, filed August 11, 1958, now abandoned.

The present invention relates to the centrifugal separation of liquids. More particularly the present invention relates to a new method and system for separating liquids by centrifugation and storing separated components. Further the present invention involves a new method and system for collecting and centrifuging liquids and for storing and dispensing separated components. The new system of the present invention utilizes a new machine and new articles of manufacture.

The invention has utility in the collection and centrifugal separation of a variety of liquid mixtures having immiscible components and in the separate storage of separated components, particularly in the handling of biological materials. Examples of the handling of biological materials enhanced by this invention are the preparation of nutrient media, tissue fractionation, and the research fractionation of milk and the separation of virus and bacteria therefrom. Perhaps the chief utility of the inventioin is in collection and separation of whole blood and storage blood components, and the invention will be illustrated by way of example in this connection.

As is well known, whole blood is a fluid tissue comprised of a variety of solid particles suspended in colloidal plasma. Chief among the suspended particles are the red cells, the white cells, and the platelets. Suspension of the solid particles is maintained by vascular circulation in a parent organism. Whole blood is not a true dispersion, as evidenced by the spontaneous sedimentation of quiescent blood.

Accordingly, it is not difficult to effect a gross separation of several of the formed elements of blood from each other and from the plasma by centrifugation, which is nothing more than accelerated sedimentation. Such separation has great utility in a number of biological applications such as plasmapheresis, relief of thermobecytopenia and hemophilia, and so on.

For the past twenty-five years or so, it has been widespread practice to collect fresh donor blood and to store it in admixture with an anticoagulant such as acid citrate dextrose solution or other calcium complexing agents, for reinfusion when needed. However, a number of difficulties have attended this procedure. In the first place, the equilibrium state of cell destruction and resynthesis which exists in the human body does not obtain in stored blood. The various components of stored whole blood have different survival times, and the usual life of stored blood for certain purposes is largely limited to these survival times. For example, the platelets have an ordinary survival time of ony a few days.

More recently, it has been found that platelet survival can be greatly extended, with good viability, if the platelets are separately stored, as in a simple gelatine solution and at reduced temperature. Not only is the survival time of certain blood components extended by separate storage, but also the remaining components of ordinarily long survival may be separately stored for long periods without special treatment other than refrigeration.

Another difficulty arising from the use of whole blood stored with anticoagulant is encountered in those therapies in which an excessive volume of anticoagulant is contraindicated. In such cases, partial experimental evidence indicates that the prompt separation of the blood components may remove or greatly reduce, where possible in respect to other conditions, the need for anticoagulant. The platelets may be roughly considered to be coagulating agents, inasmuch as upon lysis they liberate accelerators for the transformation of prothrombin to thrombin and for the conversion of fibrinogen to fibrin by thrombin. Hence, the separation of blood components followed by reconstitution minus platelets should result in the production of a blood which has less tendency to coagulate in the absence of anticoagulants.

These and other applications render the fractionation of blood of great importance. In the past, separation has been achieved largely by one of two methods. In the earlier method, blood obtained by phlebotomy was collected in a closed and evacuated donor bottle and then transferred from the bottle to a centrifuge. This method had the advantage that the only equipment needed at the time of phlebotomy was a simple donor bottle and donor kit. The centrifuge could be centrally located and could handle the contents of a number of bottles during the time consumed by a single phlebotomy. Separation was followed by bulk storage and/or packaging of the separated fractions for therapeutic use. Simple as this method was, it suffered from the great disadvantages that asepsis could be maintained only with the greatest difficulty and that the frothing induced during handling increased the danger of embolism.

In recent years, a system for blood separation has been developed in which fresh donor blood passes directly from the donor through a closed system including a centrifuge. This new system has largely overcome the problem of turbulence and provides closed-system sterility, but it has necessitated the use of costly equipment which can be employed in conjunction with only a single phlebotomy at a time. Unless donors are meticulously scheduled so that a plurality of the same blood type are processed sequentially, then this equipment must be cleaned after each phlebotomy to prevent the mixing of blood types.

Thus, the prior art has been confronted with a dilemma: the simple, inexpensive equipment suitable for a large scale donor program often produces results that are therapeutically unacceptable, but the equipment that overcomes these disadvantages is complicated, expensive and not at all suited to the large scale processing of whole blood.

Accordingly, it is an object of the present invention to provide an improved method and system for handling biological liquids utilizing the simplest possible form of container or containers while maintaining closed-system asepsis and freedom from excessive handling of the liquids.

A further object of the present invention is to provide an improved method of handling biological liquids in which the liquids are collected, fractionated by centrifuging and stored in a simple container, which method is made possible by manipulation of the container.

A further object of the present invention is to provide a system of handling biological liquids in which the liquids are collected, fractionated by centrifuging and stored in simple containers, which system is made possible by an improved centrifuge construction.

It is a still further object of the present invention to provide novel and improved components of a system useful in the collection, centrifuging and storing of biological liquids.

By the present invention, there are provided for the first time a method and system which combine the simplicity and low cost of the earlier prior art method and apparatus with the closed-system asepsis and freedom from excessive handling of the later prior art apparatus. Preferably this is achieved by utilizing two or more containers of simplified form and manipulating the containers during centrifuging to accomplish the desired fractionating followed by storing of separated fractions and where desired by reconstituting fractions.

Reference is now made to the drawings and the following detailed description of preferred variants and embodiments of the present invention. In the drawings:

FIGURE 5 is a view in section of another form of apparatus embodying the present invention and suitable for carrying the method of the present invention;

FIGURE 6 is a view in cross section taken on the line 6—6 of FIGURE 5;

FIGURE 7 is an enlarged fragmentary view of a portion of the apparatus illustrated in FIGURE 6;

FIGURE 8 is a fragmentary view in section of a portion of the apparatus of FIGURE 5 with the parts in different relative position;

FIGURE 9 is a side elevational view taken along the line 9—9 of FIGURE 8;

FIGURE 10 is a view in section of still another modification of apparatus embodying the present invention and suitable for carrying out the method of the present invention;

FIGURE 11 is a view in plan of the apparatus of FIGURE 10;

FIGURE 12 is a view in cross section taken on the line 12—12 of FIGURE 10;

FIGURE 13 is a fragmentary detail view; and

FIGURE 14 is a fragmentary enlarged view partly in section of a modified conduit and valve assemblage adapted to be used in any of the disclosed modifications.

Referring specifically to the embodiment illustrated in FIGURES 1–4, inclusive, the rotor of a centrifuge is indicated generally at A (a showing of the prime mover for the centrifuge being omitted for simplification); a specially designed centrifuge attachment is indicated generally at B; a specially designed blood bottle is indicated generally at C; a plasma receiving bottle or container is indicated generally at D; a coupling member for holding the blood bottle and plasma bottle in cooperating position is indicated generally at E; and a combination connecting conduit and valve element assemblage is indicated generally at F.

The rotor of the centrifuge can be of any desirable conventional construction having any suitable rigid connection with attachment B and capable of rotating attachment B around axis O—O at sufficiently high speeds to give desired centrifugal forces for separating the blood fractions as described hereunder. Thus, the centrifuge will have conventional speed controls and other conventional features of centrifuges available in the art for many purposes.

Figure 1:
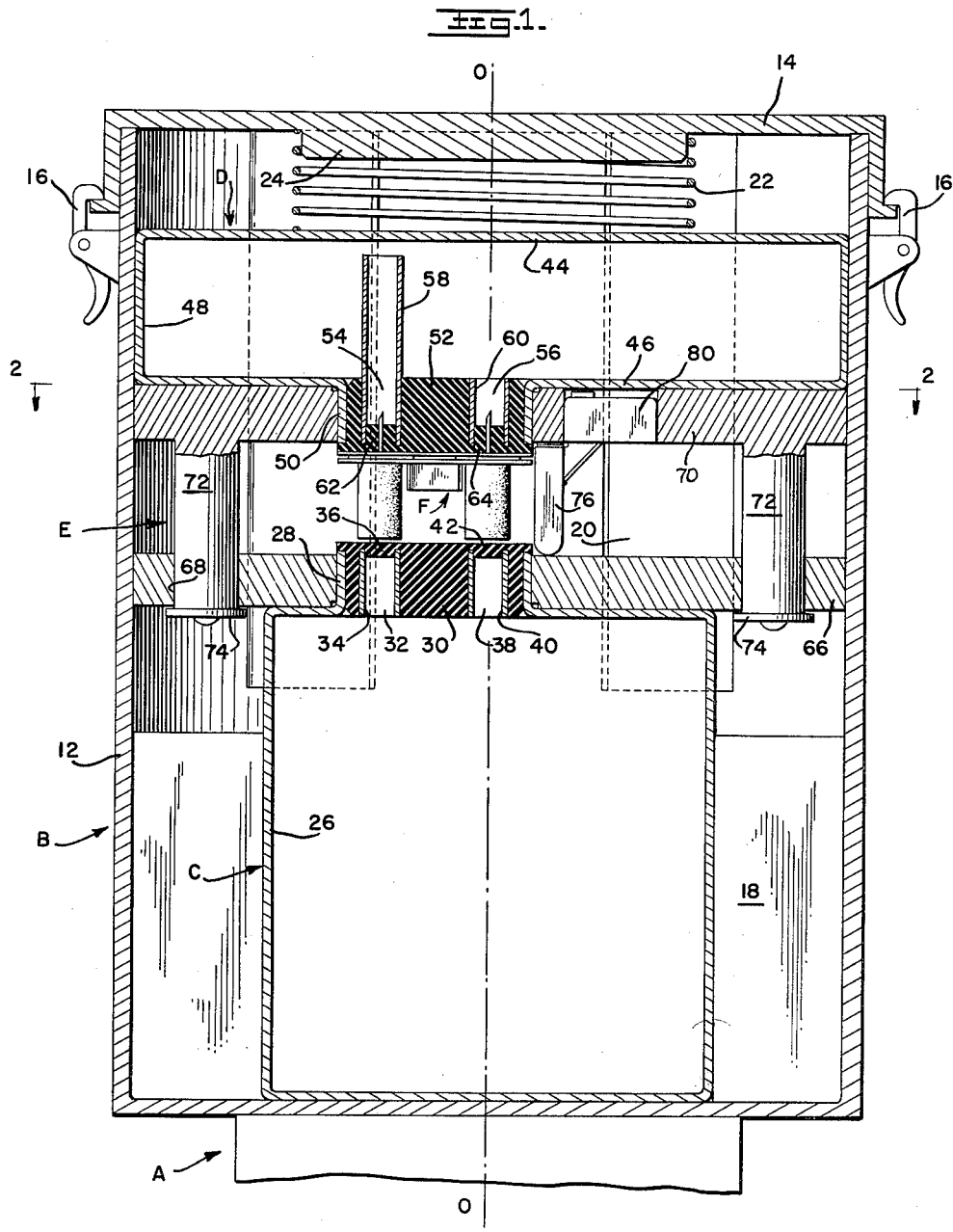
FIGURE 1 is a view in section of apparatus embodying the system of the present invention and suitable for carrying out the method of the present invention.
Figure 2:
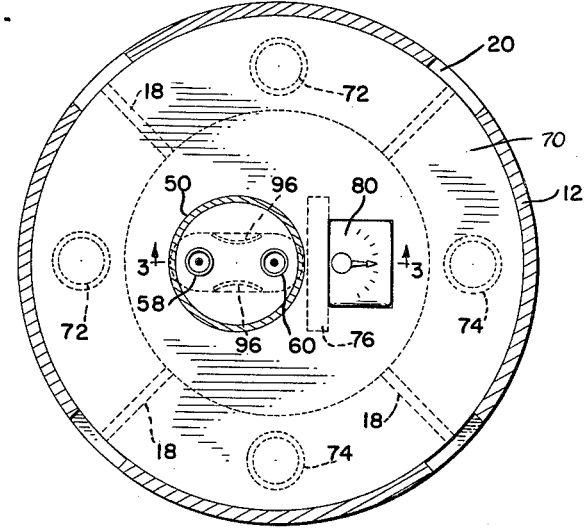
FIGURE 2 is a view in cross section taken on the line 2—2 of FIGURE 1.

Attachment B is shown in FIGURES 1–4, inclusive, in the form of a casing 12 having a closure 14 held in place by latches 16. As shown in FIGURE 2, the cross-sectional shape of casing 12 may be cylindrical and, where its diameter is greater than that of a bottle to be held therein, centering elements 18 hold the bottle in symmetrical position relative to axis O—O. Access openings 20 are formed in the side walls of the casing to facilitate insertion and removal of the bottles. A spring 22 is carried by a projecting disk 24 on the inside of closure 14 for purposes to be described.

The body of blood bottle C may correspond to conventional blood bottles for collecting 500 cc. of blood from a blood donor. In the present invention, however, the neck of the bottle is not conventionally disposed but rather is so positioned or shaped as to permit access to the interior of the bottle through the neck along a line parallel to axis O—O but spaced therefrom a critical distance which is much greater than the greatest corresponding distance possible in a conventional blood bottle. One way of accomplishing this desideratum of the present invention is to position the neck 28 eccentrically of the body portion 28 relative to the central axis falling on axis O—O and thus provide a neck of circular cross section which will take a stopper of the same size as those provided in conventional blood bottles. The stopper 30 in the embodiment of FIGURES 1–4, inclusive, is formed of the same rubbery, hollow needle penetrable, self-sealing material as those used in conventional blood bottles. Where desirable, stopper 30 may be countersunk to form a well 32 facing the interior of the bottle and a metal guide tube 34 may be integrally molded into the stopper to line this well. The exterior portion of plug 30 closing the upper end of well 32 may be a disk 36 of material corresponding to and integral with the material of the body of plug 30 but differing in color. Thus, with plug 30 being black, disk 36 closing the top of tube 34 and integrally molded into the body of the plug may be red. In this way, the exact location of tube 34 will be indicated on the exterior of plug 30. A corresponding well 38, guide tube 40 and color disk 42 are integrally formed in plug 30 but closer to the central axis of the bottle. Since plug 30 and neck 28 are circular in cross section, plug 30 may be rotated to position disk 36 accurately with respect to the axis of the bottle where different quantities of blood are to be centrifuged or different biological liquids are to be centrifuged.

Although blood bottle C has been shown having a cylindrical side wall, departures from this shape are permissible so long as a horizontal section at any point through the side wall is circular. The bottle may be formed of any suitable material, preferably with the internal surfaces treated to make them non-wetting relative to the blood. Thus, bottle C presents in its interior a compartment which, when spinning on axis O—O, will cause the least possible frothing and damage to the blood constituents by shear forces.

Bottle or container D may be any suitably shaped hollow body so long as a horizontal section through the side walls thereof at any point is in the form of a circle. It is shown of greater diameter than bottle C in order to develop higher centrifugal forces as described below. Container D is made up of a body portion having end walls 44 and 46 and a side wall 48. In the embodiment illustrated in FIGURES 1–4, inclusive, a neck 50 is eccentrically disposed relative to axis O—O in a position corresponding to neck 28 and a stopper 52 closes the opening formed by the neck. Stopper 52 is countersunk to form wells 54 and 56 corresponding respectively to wells 32 and 38 in stopper 30. A tube 58 in well 54 corresponds to tube 34 in well 32 but extends upwardly into the compartment formed by the interior walls of container D. A tube 60 in well 56 corresponds to tube 40 in well 38 of plug 30. Different colored disks 62 and 64 in plug 52 correspond to disks 36 and 42, respectively, of plug 30.

Coupling member E holds blood bottle C and plasma container D in cooperating position and permits them to move toward each other at the proper moment during centrifuging. A lower body member 66 may rest on bottle C with an opening snugly receiving neck 28. A plurality of guide openings 68 are formed in lower member 66 near the periphery. An upper body member 70 has an opening snugly receiving neck 50 of plasma container D to position plugs 30 and 52 in spaced and faceto-face relation. A plurality of guide posts 72 coact with guide openings 68 to constrain the upper and lower body members solely to movement toward and away from one another. Cap members 74 on posts 72 limit extreme movement of these parts away from one another. With blood bottle C, plasma container D and coupling member E in place within the centrifuge attachment B, spring 22 or gravity or both urge plasma container D downwardly. A collapsible leg 76 hinged at 78 holds the body members 66 and 70 in extreme spaced position. A timer 80 carried by the upper body member 70 actuates a link 82 at the proper moment during centrifuging to collapse leg 76 to permit the upper body member 70 and the lower body member 60 to approach one another.

Figure 3:
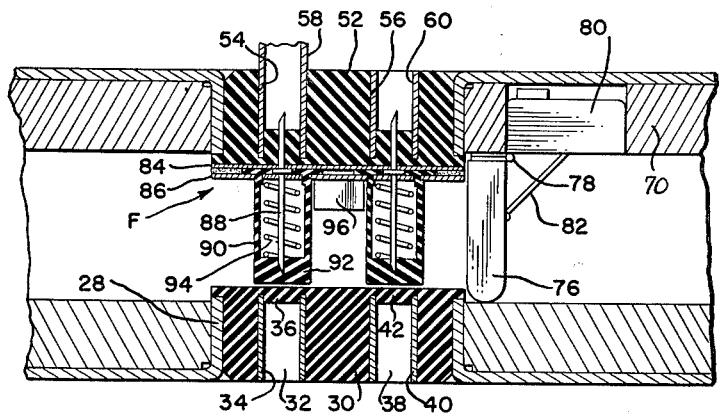
FIGURE 3 is a fragmentary view in section of part of the apparatus illustrated in FIGURE 1.
Figure 4:
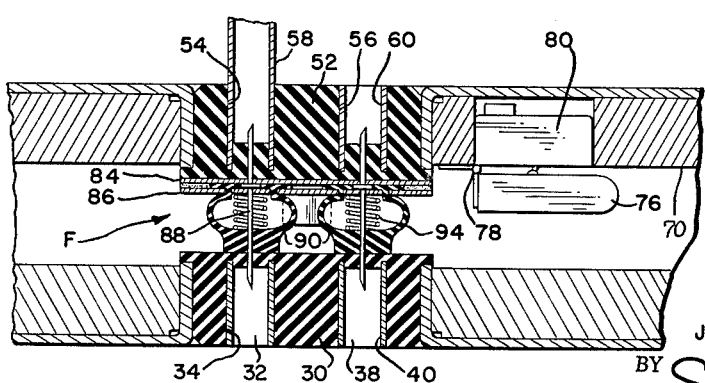
FIGURE 4 is a fragmentary view in section corresponding to FIGURE 3 with the parts in different relative position.

Connecting conduit and valve element assemblage F is best illustrated in FIGURES 3 and 4. This assemblage includes a body member formed of two sheet members 84, 86 of sufficient structural strength to rigidify the assemblage cemented together in spaced relation. Held between these sheet members is a flange integrally formed intermediate the ends of a hollow needle 88 projecting on either side of the body member. The portion of the needle projecting on one side of the body member is enclosed in a resilient tube 90 having a thickened end 92 in which the open end of needle 88 is imbedded and sealed. A spring 94 within tube 90 urges the tube into extended position. The assemblage includes a pair of finger grasping elements 96. Where desired, a second and identical hollow needle and encasing tube is supplied as illustrated. The exposed ends of the hollow needles are shown piercing through the disks 62 and 64 of stopper 52 but the assemblage could just as well be initially attached to stopper 30 with the exposed ends of the hollow needles penetrating disks 36 and 42.

An example of the use of the system of FIGURES 1–4, inclusive, in connection with the handling of blood is as follows: a stoppered and pyrogen-free bottle C may be evacuated by means of conventional apparatus for evacuating phlebotomy bottles and including a hollow needle penetrating the self-sealing material of stopper 30, the hollow needle being in communication with a vacuum pump. The stopper 30 will have been placed in the bottle in such angular position that well 32 is at a point radially spaced from the axis of the bottle so that access can be had through a hollow needle to withdraw the desired constituent or fraction of the blood during centrifuging. The evacuated bottle is sealed in any conventional way and can then be stored ready for use in a hospital or other blood donor center. An individual bottle is placed at the side of a phlebotomy and the conventional seal removed just prior to hemolation. The adapter of a donor tube is inserted through stopper 30, preferably at a point other than through disk 36 or 42. The phlebotomy needle is inserted in the vein of the blood donor and the donor tube clamp is released so as to establish communication between the interior of the bottle C and the vein of the donor.

When the desired quantity of blood has been collected, the donor tube adapter is removed from stopper 30 and the self-sealing material of the stopper immediately seals the interior of bottle C. Bottle C may now be refrigerated pending centrifuging or placed directly into centrifuge attachment B. The bottle is rotated about its axis O—O for a period of time necessary to effect a separation of the red cell fraction from the plasma fraction, for example, 20 minutes at 1200 revolutions per minute or for shorter periods at correspondingly higher speeds. The separation of the blood fractions is accomplished under the influence of centrifugal force, the red cells and some of the white cells migrating toward side wall 26 of bottle C.

After bottle C containing blood to be centrifuged is placed in centrifuge attachment B, coupling member E is placed in casing 12 and a pyrogen-free, stoppered and evacuated container D is placed in casing 12 on top of coupling member E with the neck 50 received in the opening in upper body member 70. Prior to insertion of container D in casing 12, valve and conduit assemblage F is removed from a sterile package and inserted in plug 30 or plug 52, whichever is more convenient. Whether one or two needles 88 are used, the assemblage is properly positioned by the needle or needles piercing the different-colored disks in the stopper. Where it is desired to separate plasma and red cell fractions in containers D and C, respectively, only one needle is used and this needle pierces the disk 36 or 62 so that separated plasma will be trapped in container D by dip tube 58. Where it is desired to separate the plasma into fractions and then return the plasma to the red cell fraction in container C, both needles are used.

When the two containers C and D have been placed in casing 12 ready for centrifuging, leg 78 is in vertical position thereby maintaining the two containers isolated from one another with the outer ends 92 contiguous to the disks of the facing stopper. Timer 80 has been set to the time required for a good separation of red cell fraction and plasma fraction and with casing closure 14 in latched position the centrifuging is started.

Assuming blood bottle C is designed under conventional practice to receive the customary 500 cc. of blood from one donor, neck 28 is made enough or positioned eccentrically, as shown, so that well 32 and therefore hollow needle 88 will be located in the plasma zone after the red cell fraction has migrated outwardly to form a layer of red cell fraction in contact with side wall 26 of blood bottle C and a plasma fraction concentrically arranged with respect to the red cell fraction and inwardly thereof toward the axis of rotation O—O. It can be assumed that about one-half the 500 cc. of blood will be in the red cell fraction and about one-half in the plasma fraction and giving a safety layer of 10 or 20 cc., the hollow needle 88 should present its open end at a point in the plasma layer on the axis O—O side of the safety layer. It will be apparent that the distance between the open end of hollow needle 88 and axis O—O will depend upon the size of blood bottle C and the extent to which it is supplied with blood by a donor. The showing in the drawings is purely schematic since even if blood bottle C were filled with blood at the time of the phlebotomy, which is impractical, the line between the red cell fraction and the plasma fraction would be in the neighborhood of 5/7 of the radial distance from axis O—O to side wall 26. Of course, in the fractionation of other biological liquids, the point of withdrawal of the lighter fraction might be much closer to the axis O—O than that shown in the drawings.

When the requisite centrifuging time has expired, a satisfactory separation of red cell fraction and plasma fraction has taken and timer 80 trips leg 76 through link 82. This permits spring 22 carried by closure 14, acting with gravity, to move container D toward blood bottle C. This movement effectuates communication between the interiors of these containers as hollow needle 88 pierces thickened portion 92 and disk 36. All the plasma fraction on the axis side of needle 88 is immediately ejected out of blood bottle C by centrifugal force and into the interior of container D, leaving within blood bottle C the red cell fraction and any desired amount of the plasma fraction constituting a safety layer. If the purpose of the centrifuging is merely to separate a plasma fraction and a red cell fraction, only one needle 88 would have been used in conjunction with disks 36 and 62 and the centrifuge can be stopped. Dip tube 58 then traps the plasma in container D, and this container and blood bottle C can be taken out and separately stored for future use. If it is desired to separate platelets from the plasma fraction, centrifuging is continued at the same or higher speed. Where container D has a larger diameter, as shown in the drawings, the same centrifuging speed will result in higher centrifugal forces acting on the platelets because of the greater radius and therefore the greater centrifugal forces acting on the platelets. When a pack of platelets has collected on the interior of the side wall 48 of container D, the centrifuging is stopped. If it is desired to form a reconstituted blood fraction in blood bottle C, the double needles have been used and on deceleration of the centrifuge, plasma drains back into blood bottle C through well 56, well 38 and the associated hollow needle.

In disassembling the system after centrifuging, container D is removed from casing B. As container D moves upwardly, spring 94 maintain thickened portion 92 in contact with plug 30 until flexible tube 90 has extended to its extreme position, in which position the open end of hollow needle 88 is sealed by thickened portion 92. Before placing container D in storage, conduit and valve assemblage F can be withdrawn and discarded. Of course, the foregoing action of assemblage F would be identical in the event the assemblage is carried by plug 30. In such case, assemblage F can be withdrawn and discarded before blood bottle C is placed in storage.

The modification of the present invention illustrated in FIGURES 5–9, inclusive, is similar in over-all functions to that just described and the functional units will therefore be identified in the same manner. Thus, A indicates generally the rotor of a centrifuge; a specially designed centrifuge attachment is indicated generally at B; a specially designed blood bottle is indicated generally at C; a plasma-receiving bottle or container is indicated generally at D; a coupling member for holding the blood bottle and plasma container in cooperating position is indicated generally at E; and, a combination conduit and valve assemblage is indicated generally at F.

In this modification, centrifuge attachment B is made up of an open-ended cup or casing 112 having gripping elements 114 formed of rubber or the like for frictionally engaging and holding blood bottle C during centrifuging.

Blood bottle C is made up of a side wall 116, a bottom wall 118 and a top wall 120, the latter carrying a transversely elongated neck 122. Neck 122 is closed by a penetrable, self-sealing stopper 124 similar in construction to stopper 30 of the previously described modification and having similar wells 132, 138 and tubes 134, 140. As in the previously described embodiment, colored disks 136 and 142 close the upper ends of these tubes.

Plasma container D is similar to that of the previously described modification with a bottom wall 144, top wall 146 and side wall 148. A neck 150 is preferably elongated transversely to correspond with neck 122 of blood bottle C and is closed by a stopper 152 of penetrable, self-sealing material, as in the case of the other stoppers, and including wells 154 and 156, the latter having a dip tube 158 and the former having a tube 160. Colored disks 162 and 164 complete the stopper 152.

Plasma container D and its stopper 152 present an opening 163, the purpose of which will be explained later, closed by a plug 165.

Coupling device E of the present embodiment is made up of a lower body member 166 and an upper body member 170 having telescoping portions 168 and 172 carried by these members respectively. The upper and lower body portions are held against relative rotation through the medium of a pair of identical cooperating slots and detents 174, 176. By means of a narrowed upper portion 178 in each slot 174, the upper and lower body members are prevented from becoming disengaged with one another but each detent 176 is carried upon a leaf spring 180 so that depression of the detents permits a narrow portion 182 to pass through narrow portion 178 of each slot 174 to completely disengage the upper and lower members.

Since the lower body member 166 of the coupling device snugly engages neck 122 of blood bottle C and upper body member 170 snugly engages neck 150 of plasma bottle D, the blood bottle and plasma bottle are held against relative rotation but are movable toward and away from each other.

Conduit and valve assemblage F is made up of a pair of plates 184 spaced apart by a filler member 186 to which each plate is cemented or otherwise suitably held. This plate construction is held midway between plugs 124 and 152 through identical springs 188 and 190. Carried by this plate structure is one or two hollow needles, held in the plate structure by a flange 192 on the needle. Each needle is inserted through an opening 194 in the upper plate, large enough to take the flange, and through registering slots 196 in both plates. On movement of the needle and flange 192 radially outwardly in slot 196 (see FIGURE 7) the flange is frictionally gripped between the plates. As so held, each needle is positioned in alignment with the corresponding colored disks in the stoppers so that movement of the blood bottle C and plasma container D toward each other causes the two ends of the hollow needle to establish communication between the interiors of these vessels.

The operation of the modification illustrated in FIGURES 5–9, inclusive, is similar to that of FIGURES 1–4, inclusive, except that the plasma bottle D is urged toward the blood bottle C at the proper moment during centrifuging by manually pressing an object against the center of cap 165. Used needles are replaced by disconnecting the upper and lower body members of coupling device E when the device is not in use, withdrawing the used needle and inserting a new needle which may remain in its plastic, sterile envelope, the penetration of the needle into the stoppers taking place through such envelope. In operation it is essential that the springs 188 and 190 be sufficiently strong so as to maintain plate structure 184 equispaced from the stoppers and thereby preventing one end of a needle from coming out of its associated plug while the other end of the needle is in communication with the interior of the other vessel. Of course, the springs must be strong enough to hold the weight of upper body member 170 and plasma container D when empty. Where desirable, blood bottle C, coupling device E and plasma container D can be used in combined relationship during a phlebotomy. In such case, plasma container D is held by any convenient means in the lowered position with one or two hollow needles placing the interiors of the two vessels in communication. By this expedient, the vacuum present in plasma container D is made available during the phlebotomy so that more blood can be collected in blood bottle C or blood bottle C can be made smaller in size. The adapter of the donor tube is inserted through passage 163 of the plasma container and thence through the center of plug 124 of the blood bottle C.

The modification of the present invention illustrated in FIGURES 10–13, inclusive, involves a specially designed centrifuge and components for fractionating blood and other biological liquids in a plurality of the bottles in which the liquid may be collected. Unlike the preceding modifications, the axis of rotation is not within the blood bottle or plasma container but is disposed between two or more bottles. The blood bottles used may therefore be of conventional shape so long as the neck openings are large enough to accommodate stoppers designed to carry out the functions described below.

The specific embodiment of the centrifuge system illustrated in FIGURES 10–13 comprises a centrifuge indicated generally at A; a holder indicated generally at B for a pair of blood bottles; blood bottles indicated generally at C; a pair of plasma containers indicated generally at D; a combination plasma container holder and coupling device indicated generally at E; and, connecting conduit and valve assemblages indicated generally at F. It will thus be apparent that there are present in this modification generally equivalent functional units to those of the two preceding modifications already described.

Centrifuge A is made up of a base 300 carrying an electric motor 302 having a control 304 for starting and stopping the motor and changing its speed. Motor 302 drives a gear 306 which meshes with a ring gear 308 carried by the periphery of a turntable 310 rotatable on a ring ball bearing 312. Turntable 310 includes an integral, internally-threaded collar 313 in which is screw-threaded the lower end of an inner spindle 314 which extends vertically a considerable distance. Spindle 314 is rotatably received within an outer tubular spindle 315, the outer spindle acting as a vertical guide member for the inner spindle. For this purpose there is mounted on the lower end of outer spindle 315 a bearing member 316 carrying a ball-bearing raceway 317 having its inner member snugly but slidably received on inner spindle 314. At the upper end of outer spindle 315 is a similar bearing member 318 carrying a similarly mounted ball-bearing raceway 319. Base 300 incorporates a supporting annular housing 320 which is cut away where necessary to accommodate gear 306. Housing 320 includes a trackway 322 and here again, portions of trackway 322 are cut away to accommodate gear 306. Slidably received in trackway 322 is an outer spindle support 323 which is vertically slidable in trackway 322 but is held against rotation therein by any convenient means such as cooperating spline 324 on outer spindle support 323 and groove 325 in trackway 322. Extreme upward movement of outer spindle support 323 is limited by abutment 326 at the upper end of groove 325, against which the upper end of spline 324 engages. Outer spindle support 323 carries a combination horizontal and vertical thrust ball bearing 328 on which is mounted the lower end of outer spindle 315. An upper ball bearing 330 is also carried by outer spindle support 323 and acts to constrain outer spindle 315 to vertical rotary movement.

Blood bottle holder B is carried by outer spindle 315 and is formed of a pair of receptacles 338 supported at 180° relationship on outer spindle 315 through integrally case portions 340, 340. Blood bottle holders 338 present pockets open at their upper ends and having bottoms which support a pair of blood bottles. The shape of these pockets can be such as to accommodate a conventional blood bottle but preferably they are designed to receive specially designed blood bottles of noncircular cross section which do not have to be secured against rotation in the pockets during centrifuging and which can be shaped and dimensioned to bring the interface or buffy coat between the red cell fraction and the plasma fraction at a desired distance from the axis of rotation and at the proper point relative to the bottle neck. In the embodiment illustrated the pockets in blood bottle holders 338 are shaped and dimensioned to hold snugly blood bottles of rectangular cross section.

As just described, blood bottle C may be of conventional shape but in the preferred embodiment are shown rectangular. The necks may be centrally located or may be eccentrically located and in the preferred embodiment are located centrally with the bottle being dimensioned to bring the plasma fraction to be ejected from the bottle during centrifuging under the proper point in the stopper. Except for the rectangular shape, each blood bottle 342 and its associated stopper 344 is the same as that shown in the modification of FIGURES 1–4, inclusive, and therefore will not be described in detail at this point.

Plasma bottle holder E is carried by inner spindle 314 and is made up of a pair of open top pockets 350 connected through a plate 352 integral with the bottoms 354 of each pocket. Each bottom 354 has an opening 356 positioned radially of the axis of rotation of the spindles so as to coincide with the stoppers 344 of blood bottles 342. Specially designed plasma containers or bottles 358 are held in pockets 350 with the necks of the bottles disposed downwardly. As will be seen from FIGURES 11 and 12 each plasma container is shaped along the lines of a segment of a circle for reasons set out hereinunder. Except for the segmental shape of the plasma containers, they correspond to the plasma container of the embodiment of FIGURES 1–4, inclusive, and the stoppers 360 can be identical with those of FIGURES 1–4, inclusive. Further description of these components of the system is not believed necessary at this point. The two plasma container pockets are supported in horizontal position on the upper end of inner spindle 314 with plate 352 apertured to receive a reduced section 362 on the upper end of inner spindle 314. An integral collar 364 on plate 352 carries a slot 366 which coacts with a spline 368 carried by reduced section 362 to hold the parts against angular rotation. A washer and stud bolt arrangement 369 hold these parts in assembled relation. Plate 352 carries a downwardly depending lug 370 dimensioned to be received in a slot 372 in the upper end of outer spindle 315. A retainer bar 374 hinged at one end at 376 can be closed on the plasma containers and latched at 378 to hold the plasma containers in place during centrifuging.

Conduit and valve assemblage F can be any suitable device for connecting the interiors of juxtapositioned blood bottles and plasma containers on movement of the stoppers toward each other but they are illustrated as being in the form of combination valve and conduit assemblages 380 made up of elements like elements 88, 90, 92 and 94 of the embodiment of FIGURES 1–4, inclusive. The illustrated assemblage F and the associated stopper 360 in respect to each blood bottle and associated plasma containers being the same and in the same relationship as the embodiment of FIGURES 1–4, inclusive, no further description is believed necessary at this point. As in the case of the modification of FIGURES 1–4, inclusive, the assemblage can be initially attached to either stopper. In the embodiment presently being described, the assemblages are shown initially applied to the blood bottles. The relative movement between blood bottles 342 and plasma containers 358 necessary to place their interiors in communication through the medium of each conduit and valve assemblage is accomplished by the permissible relative longitudinal movement between inner spindle 324 and outer spindle 315. This movement can be brought about through lever 382 which has a hand-operable knob 383 projecting out through a slot 384 in the base 300. This lever is pivoted on pin 386 and through arm 388 moves outer spindle support 323 vertically between an extreme lower position and an extreme upper position. In addition to the lowermost and uppermost positions of outer spindle 315, there is an intermediate position and it is in this position that outer spindle 315 is shown in FIGURE 10. In the lowermost position, blood bottle holder B has no connection with inner spindle 314 and the bottoms of receptacles 338 each carry a segmental strip of brake material 390 which registers with an annular strip of brake material 392 on the upper surface of housing 320 for decelerating the blood bottle holder. In the intermediate position shown in FIGURE 10 and in the uppermost position described, downwardly projecting lug 370 remains engaged in slot 372 thereby interconnecting blood bottle holder B and inner spindle 314 in both these positions. In the intermediate position illustrated, conduit and valve assemblage F is contiguous to the juxtaposed plug 360 in each plasma container but communication between the interiors of the blood bottles and the plasma containers is not effected. In movement of outer spindle support 323 to the uppermost position, the hollow needles in the conduit and valve assemblages F are pushed through the juxtaposed plugs 360 of the plasma containers and communication between the interiors of the plasma containers and the blood bottles is established. For convenience, slot 384 can have two notches 396 and 398 to retain the bearing holder in the intermediate and uppermost positions respectively.

The system of this modification is used in the same manner as those of the preceding two modifications except that two or more blood bottles are centrifuged at the same time and around an axis of rotation outside of the bottle. Where conventional blood donor bottles are centrifuged, some means is necessary to assure that the bottles do not move angularly around their own axes during centrifuging because this would disturb the point of withdrawal of the plasma fraction due to rotation of the stopper. For this reason, noncircular cross section blood bottles are preferable and the rectangular bottles illustrated can be dimensioned to bring the interface between the red cell fraction and the plasma fraction or the buffy coat at a desirable point vertically below the stopper. Where desirable with noncircular blood bottles, the stoppers can be angularly rotated at the time a bottle and plug are assembled so as to place the plasma withdrawal indicating point, such as disk 62 of FIGURE 1, at the exact point desired.

In operation, a pair of blood bottles from phlebotomies or refrigerated storage are placed in the two pockets presented by receptacles 338. At this time, outer spindle support 323 is in its lowermost position and the plasma container holder E is in the loading position shown in FIGURE 11 which gives ready access to the open upper ends of receptacles 338. Empty plasma fraction containers 358 are placed in receptacles 350 with the necks fitted into openings 356. These plasma fraction containers can be of any desired shape but by making them flat and elongated with the neck at one end, the plasma fraction is subjected to greater centrifugal forces at the same speed than the whole blood in blood bottle holder B. Additionally, by making them in the shape of a segment of a circle, a greater volume of plasma takes up a position at the farthest possible distance from the axis of rotation thereby subjecting this greater portion of the plasma fraction to the highest centrifugal forces present. When the machine is loaded and retainer bar 374 latched, plasma container holder E is rotated sufficiently to bring about registry of lug 370 and slot 372, thereby registering the stoppers 360 in the plasma fraction containers and the stoppers 344 in the blood bottles. At this time, lever 382 is moved into intermediate position as shown in FIGURE 10 to engage lug 370 and slot 372. Motor control 304 is operated to start the motor and the two spindles being locked together through lug 370 and slot 372, blood bottle holder B and plasma container holder E are rotated in synchronism. When a good separation of red cell fraction and plasma fraction has taken place after a period of centrifuging, lever 382 is moved down out of notch 396 and engaged in notch 398. This action, as explained above, places the interiors of the blood bottles and the plasma fraction containers in communication at least through one hollow needle, all as explained in the operation of the preceding modifications. Transfer of the plasma fraction to the plasma fraction containers takes place through the hollow needles and, if that is the only separation desired, motor control 304 is operated to stop the motor. Since in such an operation only the hollow needles communicating with the dip tubes are used, the plasma is trapped in the plasma containers. The machine is moved into unloading position by a reversal of the steps just described, the retainer bar 374 is released and the plasma fraction containers and blood bottles are placed in storage ready for use when needed.

When operating to separate platelets from the plasma fraction the motor is not stopped upon transfer of the plasma fraction to the plasma containers but instead lever 382 is moved out of notch 398 and allowed to return to its uppermost position in slot 384 thereby permitting outer spindle support 323 to move down to lowermost position. Blood bottle holder B is thereby released from connection with inner spindle 314 and the two braking surfaces 390 and 392 decelerate the blood bottle holder to a gentle stop. In this manner, further centrifuging of the red cell fraction is eliminated together with the possibility of injuring this fraction. Centrifuging of the plasma fraction continues since plasma container holder E remains in positive engagement with inner spindle 314. Where desirable, the speed of the centrifuging may be increased through motor control 304. In any event the platelet pack is adhered on the outer wall of each plasma container. When the platelet pack has been established, the blood bottles and the plasma containers may be unloaded from the centrifuge and the remaining plasma fraction, minus the platelets, withdrawn through a hollow needle to a separate storage container or point of use. Where it is desirable to reconstitute the blood in the blood bottles by returning the remaining plasma fraction minus platelets, the machine is stopped and knob 382 is again moved into notch 396. This tends to move outer spindle support 323 upwardly but, since lug 370 is probably not in alignment with slot 372, only limited movement of the outer spindle support 323 can take place. The inherent resilience of lever 382 permits movement of lever 382 to notch 396 and maintains a resilient upward force on outer spindle support 323 so that plasma container holder E can be rotated to the point where lug 370 slips into slot 372. This necessarily brings the same stopper 344 into alignment with the same stopper 356 as when the machine was started. Knob 382 can thereupon be moved down into notch 398 to bring the interiors of the blood bottles and the plasma containers into communication. Since two needles would be used in each stopper at this stage the remaining plasma fraction, minus the platelets, thereupon drains into the respective blood bottle from which it originally was ejected. After this transfer has taken place, knob 382 is raised to its uppermost position and the machine unloaded as before.

FIGURE 14 shows a modified form of valve and conduit assemblage F which can be used in any one of the modifications disclosed.

A pair of registered and juxtaposed stoppers 402, 404 are shown, representative of the stoppers in any one of the preceding modifications. The assembly comprises a pair of hollow needles indicated generally at 406, 408 which, if desirable, can include narrow portions 410, 412, respectively, and larger diameter portions 414, 416, the narrow portion being adjacent the tip of each needle. Each needle 406 and 408 is carried by an enlarged connector and finger hold member 418 and 420, respectively, each needle having an integral flange 422 molded into the body member of the connector. A flexible tubing 424 connects the holders 418 and 420, the tube carrying a simple clamp device 426.

In operation, a needle is inserted into the resilient self-sealing material of each stopper until the resistance of the greater diameter portion of the needle is felt. This is done preferably after a blood bottle is placed in a centrifuge and before the plasma fraction container is placed in juxtaposed operative position. After the needles are so inserted the plasma fraction container is placed in the centrifuge with the two connectors 418 and 420 in contiguous and registered position. Clamp 26 is in open position. Care must be taken in arranging tube 424 so that it does not take a direction approaching the center of rotation. Thus in respect to the embodiments of FIGURES 1 to 9 inclusive, the hose preferably is coiled around the stopper or neck of the associated bottle or container without approaching the axis of rotation. In the case of the embodiment of FIGURES 10 to 13 inclusive, each tube is arranged in any convenient manner in which it does not approach closer to the spindles than the associated needles.

In movement of the associated blood bottle and plasma fraction container toward each other to bring the interiors into communication, as described in respect to the foregoing embodiments, connectors 418 and 420 come into contact and further movement presses the needles into the wells in the stoppers to place the interiors of the bottle and the plasma fraction container in communication. When it is desired to remove the valve and conduit assemblage of FIGURE 14 so as to break communication between the interiors of the blood bottle and the plasma fraction container, the centrifuge may be stopped and clamp 426 placed in tube closing position. Where desirable the clamp 426 may be eliminated and one of the needles partially withdrawn until it is sealed by the stopper material. The other needle can then be withdrawn followed by the first when either or both these stops are desirable.

The simplicity of the combination valve and conduit assemblage of FIGURE 14 makes it readily usable in many ways to transfer fractions of the liquid material being centrifuged, both during centrifuging and after separation of fractions. Thus needle 408 may be positioned to eject plasma fraction from the bottle into dip tube 58, no other needle being used to pierce stopper 52. On separation of the plasma fraction, assemblage F of FIGURE 14 can be withdrawn from well 54 and, after platelet separation, connected with well 56 to thereby drain remaining plasma fraction back into the blood bottle for reconstitution of blood therein.

The terminology "concentric to an axis" as used in this specification and claims in referring to the side walls of a container or bottle is intended to embrace any wall structure which coincides with a continuous surface generated by points rotating in circles in an infinite number of planes normal to the axis, with the centers of the circles lying along the axis of rotation, each such plane passing through the continuous surface only once.

The terms "revolve" and "revolution" are used herein to embrace both the turning of a body around an axis outside the body and the turning of a body about an axis passing through the body while the terms "rotate" and "rotation" are used to designate only turning of a body around an axis passing through the body.

It will be evident that the combination of a blood bottle and plasma container and conduit means for interconnecting the blood bottle and plasma container may be termed a container system.

Although the present invention has been described in connection with preferred embodiments, it is to be understood that modifications and variations may be resorted to without departing from the spirit of the invention, as those skilled in this art will readily understand. Such modifications and variations are to be considered within the purview and scope of the invention as defined by the appended claims.

What is claimed is:

1. In a centrifuge system,
   (a) a container support mounted for revolution about an axis,
   (b) a container carried by the container support for revolution about said axis,
   (c) a main compartment formed in the interior of the container,
   (d) means associated with the container support engaging the container and holding the container against movement relative to the support,
   (e) a hollow member,
   (f) a second compartment formed in the interior of the hollow member,
   (g) connecting means holding the container and the hollow member against movement relative to one another,
   (h) means associated with the connecting means operable to free the container and the hollow member for separation one from the other,
   (i) means associated with the connecting means actuatable to constrain the container and the hollow member to controlled relative movement,
   (j) passageway means extending between the main compartment and the second compartment placing the main compartment and the second compartment in fluid communication when open,
   (k) valve means closing the passageway,
   (l) valve actuating means actuated by said controlled relative movement to open the passageway,
   (m) and means for initiating said controlled relative movement during centrifuging.

2. In a centrifuge system,
   (a) a container support mounted for revolution about an axis,
   (b) a container carried by the container support for revolution about said axis,
   (c) a sealed main compartment formed in the interior of the container,
   (d) means associated with the container support engaging the container and holding the container against movement relative to the support,
   (e) a hollow member,
   (f) a second compartment formed in the interior of the hollow member,
   (g) connecting means holding the container and the hollow member in nonmovable relation to each other,
   (h) means associated with the connecting means operable to free the container and the hollow member for separation one from the other,
   (i) means associated with the connecting means actuatable to constrain the container and the hollow member to controlled relative movement in a direction parallel to the axis of revolution,
   (j) passageway means extending between the main compartment and the second compartment placing the main compartment and the second compartment in fluid communication when open,
   (k) valve means closing the passageway,
   (l) valve actuating means actuated by said controlled relative movement to open the passageway,
   (m) and means for initiating said controlled relative movement during centrifuging.

3. In a centrifuge system,
   (a) a container support mounted for revolution about an axis,
   (b) a container carried by the container support for revolution about said axis,
   (c) a sealed main compartment formed in the interior of the container,
   (d) means associated with the container support engaging the container and holding the container against movement relative to the support,
   (e) penetrable means in the wall of the main compartment,
   (f) a hollow member,
   (g) a second compartment formed in the interior of the hollow member,
   (h) connecting means holding the container and the hollow member in non-movable relation to each other,
   (i) means associated with the connecting means operable to free the container and the hollow member for separation one from the other,
   (j) passageway means extending between the main compartment and the second compartment placing the main compartment and the second compartment in fluid communication when open,
   (k) the passageway means terminating in hollow needle means dimensioned to penetrate through said penetrable means to place the compartments in fluid communication,
   (l) and means causing the hollow needle means to penetrate the penetrable means during centrifuging.

4. In a centrifuge system,
   (a) a container support mounted for revolution about an axis,
   (b) a container carried by the container support for revolution about said axis,
   (c) a sealed main compartment formed in the interior of the container,
   (d) means associated with the container support engaging the container and holding the container against movement relative to the support,
   (e) penetrable means in the wall of the main compartment,
   (f) a hollow member,
   (g) a second compartment formed in the interior of the hollow member, (h) second penetrable means in the wall of the second compartment,
(i) connecting means holding the container and the hollow member in nonrotatable relation to each other and in axial alignment relative to one another,
(j) means associated with the connecting means operable to free the container and the hollow member for separation one from the other,
(k) means associated with the connecting means actuable to constrain the container and the hollow member to controlled relative movement,
(l) passageway means extending between the main compartment and the second compartment through one of the penetrable means placing the main compartment and the second compartment in fluid communication when open, the passageway means terminating in hollow needle means dimensioned to penetrate through the other of said penetrable means on said controlled relative movement to place the compartments in fluid communication,
(m) and means for causing the hollow needle means to penetrate the other penetrable means during centrifuging.

5. In a centrifuge system,
(a) a container support mounted for rotation about an axis,
(b) a container carried by the container support for rotation about said axis,
(c) a sealed main compartment formed in the interior of the container,
(d) means associated with the container support engaging the container and holding the container against movement relative to the support,
(e) penetrable means in the wall of the main compartment,
(f) a hollow member,
(g) a second compartment formed in the interior of the hollow member,
(h) connecting means holding the container and the hollow member in nonrotatable relation to each other and in axial alignment relative to one another,
(i) means associated with the connecting means operable to free the container and the hollow member for separation one from the other,
(j) means associated with the connecting means actuatable to constrain container and the hollow member to controlled relative movement in a direction parallel to the axis of revolution,
(k) passageway means extending between the main compartment and the second compartment placing the main compartment and the second compartment in fluid communication when open, the passageway means terminating in hollow needle means dimensioned to penetrate through said penetrable means on said controlled relative movement to place the compartments in fluid communication,
(l) and means for causing the hollow needle means to penetrate the penetrable means during centrifuging.

6. In a centrifuge system,
(a) a container support mounted for rotation about an axis,
(b) a container carried by the container support for rotation about said axis,
(c) a sealed main compartment formed in the interior of the container,
(d) means associated with the container support engaging the container and holding the container against movement relative to the support,
(e) penetrable self-sealing means in the wall of the main compartment,
(f) a hollow member,
(g) a second compartment formed in the interior of the hollow member,
(h) penetrable self-sealing means in the wall of the second compartment,
(i) connecting means holding the container and the hollow member in nonrotatable relation to each other and in axial alignment relative to one another,
(j) means associated with the connecting means operable to free the container and the hollow member for separation one from the other,
(k) means associated with the connecting means actuatable to constrain the container and the hollow member to controlled relative movement in a direction parallel to the axis of revolution,
(l) passageway means extending between the main compartment and the second compartment through one of the penetrable self-sealing means placing the main compartment and the second compartment in fluid communication when open, the passageway means terminating in hollow needle means dimensioned to penetrate through the other of said penetrable self-sealing means on said controlled relative movement to place the compartments in fluid communication,
(m) and means causing the hollow needle means to penetrate the other penetrable self-sealing means during centrifuging.

7. In a centrifuge system,
(a) a container support mounted for revolution about an axis,
(b) a container carried by the container support for revolution about said axis,
(c) a sealed main compartment formed in the interior of the container,
(d) means associated with the container support engaging the container and holding the container against movement relative to the support,
(e) a hollow member,
(f) a sealed second compartment formed in the interior of the hollow member,
(g) connecting means holding the container and the hollow member in non-movable relation to each other,
(h) means associated with the connecting means operable to free the container and the hollow member for separation one from the other,
(i) passageway means extending between the main compartment and the second compartment for placing the main compartment and the second compartment in fluid communication when open,
(j) penetrable means closing the passageway means,
(k) hollow conduit means forming part of the passageway means for penetrating the penetrable means to open the passageway means, and
(l) means for actuating the last claimed means during centrifuging to place the compartments in communication.

8. In a centrifuge system,
(a) a container support mounted for rotation about an axis,
(b) a container carried by the container support for rotation about said axis,
(c) a sealed main compartment formed in the interior of the container,
(d) means associated with the container support engaging the container and holding the container against movement relative to the support,
(e) a hollow member carried by the container support for rotation about said axis,
(f) a sealed second compartment formed in the interior of the hollow member,
(g) connecting means holding the container and the hollow member in non-rotationable relation to each other,
(h) means associated with the connecting means operable to free the container and the hollow member for separation one from the other, (i) passageway means extending between the main compartment and the second compartment placing the main compartment and the second commpartment in fluid communication when open,
(j) penetrable means closing the passageway means,
(k) hollow conduit means forming part of the passageway means for penetrating the penetrable means to open the passageway means, and
(l) means for actuating the last claimed means during centrifuging to place the compartments in communication.

9. Apparatus for separating liquid mixtures into fractions of greater density and lesser density comprising:
  (a) a centrifuge having a container holding member which revolves around an axis of revolution,
  (b) a container system having a first liquid holding compartment, a second liquid holding compartment and conduit means for interconnecting the compartments, the first compartment having a penetrable means in one wall portion thereof,
  (c) the conduit means being associated at one end with the first compartment and at the other end with the second compartment, the conduit means having an opening contiguous to each end,
  (d) means carried by the container holding member holding the first compartment, the second compartment and the conduit means of the container system for synchronous revolution around the axis of revolution,
  (e) means associated with the means claimed in (d) for releasing the container system for separation of the container system from the container holding member,
  (f) means associated with the first compartment for holding and confining a discrete body of liquid mixture entirely within the first compartment during centrifuging,
  (g) wall means associated with the means claimed in (f) for holding the discrete body of liquid mixture during centrifuging to form a first fractional liquid body of more dense fraction held against a portion of the wall means remote from the axis of revolution and a second fractional liquid body of less dense fraction supported by the first fractional liquid body and a second portion of the wall means between the first fractional liquid body and the axis of revolution, one of the fractional liquid bodies being in contact with the penetrable means,
  (h) means actuated after the first and second fractional liquid bodies have formed to cause the conduit means to penetrate the penetrable means to place one opening of the conduit means in communication with the liquid fraction at a point in said one of the fractional liquid bodies,
  (i) means associated with the container holding member holding the other opening of the conduit means in communication with the interior of the second compartment and positioning the conduit means and at least a portion of the second commpartment not substantially closer to the axis of revolution than the point at which the conduit means is in communication with said one of the liquid fractional bodies in the first compartment whereby liquid fraction moves from the first compartment through the passageway means into the second compartment,
  (j) means causing a cessation of movement of liquid fraction through the passageway means when a predetermined flow of liquid has taken place, and
  (k) means associated with the second compartment for collecting the liquid fraction during centrifuging and holding the collected liquid fraction on cessation of centrifuging.

10. The apparatus of claim 9 in which the axis of revolution is outside the container system.

11. The apparatus of claim 9 in which the container holding member is rotatable and rotates around an axis of rotation.

12. Apparatus for separating liquid mixtures into fractions of greater density and lesser density comprising:
  (a) a centrifuge having a container holding member which revolves around an axis of revolution,
  (b) a container system having a first liquid holding compartment, a second liquid holding compartment and conduit means for interconnecting the compartments, the first compartment having a penetrable means in one wall portion thereof,
  (c) the conduit means being associated at one end with the first compartment and at the other end with the second compartment, the conduit means having an opening contiguous to each end,
  (d) means carried by the container holding member holding the first compartment, the second compartment and the conduit means of the container system for synchronous revolution around the axis of revolution,
  (e) means associated with the means claimed in (d) for releasing the container system for separation of the container system from the container holding member,
  (f) means associated with the first compartment for holding and confining a discrete body of liquid mixture entirely within the first compartment during centrifuging,
  (g) wall means associated with the means claimed in (f) for holding the discrete body of liquid mixture during centrifuging to form a first fractional liquid body of more dense fraction held against a portion of the wall means remote from the axis of revolution and a second fractional liquid body of less dense fraction supported by the first fractional liquid body and a second portion of the wall means between the first fractional liquid body and the axis of revolution, the second fractional liquid body being in contact with the penetrable means,
  (h) means actuated after the first and second fractional liquid bodies have formed to cause the conduit means to penetrate the penetrable means to place one opening of the conduit means in communication with the liquid fraction at a point in the second fractional liquid body,
  (i) means associated with the container holding member holding the other opening of the conduit means in communication with the interior of the second compartment and positioning the conduit means and at least a portion of the second compartment not substantially closer to the axis of revolution than the point at which the conduit means is in communication with the second liquid fractional body in the first compartment whereby less dense liquid fraction moves from the first compartment through the passageway means into the second compartment,
  (j) means causing a cessation of movement of liquid fraction through the passageway means when a predetermined flow of liquid has taken place, and
  (k) means associated with the second compartment for collecting the liquid fraction during centrifuging and holding the collected liquid fraction on cessation of centrifuging.

13. The method of separating liquid mixtures into fractions of greater density and lesser density comprising the steps of:
  (a) providing a centrifuge having a container receiving member revolvable around an axis of revolution,
  (b) providing a container system separate from the centrifuge having a first compartment containing a discrete body of liquid mixture, a second compartment and conduit means having an opening contiguous to each end for interconnecting the compartments, the first compartment having a penetrable means in one wall portion thereof, (c) placing the container system and the conduit means in the container receiving member of the centrifuge, with both compartments and the conduit means held by the member for synchronous revolution around the axis of revolution, and with the discrete body of liquid mixture confined to the first compartment, (d) revolving the container receiving member and both of the compartments synchronously around the axis of revolution for a period of time until the discrete body of liquid mixture forms within the first compartment a first fractional liquid body of more dense fraction resting against a wall of the first compartment remote from the axis of revolution and a second fractional liquid body of less dense fraction supported by the first fractional liquid body and between the first fractional liquid body and the axis of revolution, one of the fractional liquid bodies being in contact with the penetrable means, (e) then while continuing to revolve the container system around the axis of revolution initiating movement of one liquid fraction out of the first compartment through the conduit means into the synchronously revolving second compartment by causing the conduit means to penetrate the penetrable means to place one opening of the conduit means in the one fractional liquid body while holding the other opening of the conduit means in communication with the interior of the second compartment, (f) terminating movement of liquid fraction out of the first compartment to retain at least part of the other liquid fraction in the first compartment, (g) collecting liquid fraction in the second compartment during revolution of the container and holding the collected liquid fraction within the second compartment on cessation of revolution.

14. The method as claimed in claim 13 in which the container receiving member is rotatable and is rotated around an axis of rotation.

15. The method claimed in claim 13 in which the axis of revolution is outside the container.

16. The method of separating liquid mixtures into fractions of greater density and lesser density comprising the steps of:

(a) providing a centrifuge having a container receiving member revolvable around an axis of revolution, (b) providing a container system separate from the centrifuge having a first compartment containing a discrete body of liquid mixture, a second compartment and conduit means having an opening contiguous to each end for interconnecting the compartments, the first compartment having a penetrable means in one wall portion thereof, (c) placing the container system and the conduit means in the container receiving member of the centrifuge, with both compartments and the conduit means held by the member for synchronous revolution around the axis of revolution, and with the discrete body of liquid mixture confined to the first compartment, (d) revolving the container receiving member and both of the compartments synchronously around the axis of revolution for a period of time until the discrete body of liquid mixture forms within the first compartment a first fractional liquid body of more dense fraction resting against a wall of the first compartment remote from the axis of revolution and a second fractional liquid body of less dense fraction supported by the first fractional liquid body and between the first fractional liquid body and the axis of revolution, the second fractional liquid body being in contact with the penetrable means, (e) then while continuing to revolve the container system around the axis of revolution initiating movement of less dense fraction out of the first compartment through the conduit means into the synchronously revolving second compartment by causing the conduit means to penetrate the penetrable means to place one opening of the conduit means in the second fractional liquid body while holding the other opening of the conduit means in communication with the interior of the second compartment, (f) terminating movement of liquid fraction out of the first compartment to retain at least part of the other liquid fraction in the first compartment, (g) collecting liquid fraction in the second compartment during revolution of the container and holding the collected liquid fraction within the second compartment on cessation of revolution.

17. The method of separating a particulate material of intermediate density from a liquid mixture containing a more dense fraction and a less dense fraction and said particulate material comprising the steps of:

(a) providing a centrifuge having a container receiving member revolvable around an axis of revolution, (b) providing a container system separate from the centrifuge having a first compartment containing a discrete body of liquid mixture, a second compartment and conduit means having an opening contiguous to each end for interconnecting the compartments, the first compartment having a self-sealing penetrable means in one wall portion thereof, (c) placing the container system and the conduit means in the container receiving member of the centrifuge, with both compartments and the conduit means held by the member for synchronous revolution around the axis of revolution, and with the discrete body of liquid mixture confined to the first compartment, (d) revolving the container receiving member and both of the compartments synchronously around the axis of revolution for a period of time until the discrete body of liquid mixture forms within the first compartment a first fractional liquid body of more dense fraction resting against a wall of the first compartment remote from the axis of revoltuion and a second fractional liquid body made up of less dense fraction and the particulate material supported by the first fractional liquid body and between the first fractional liquid body and the axis of revolution, the particulate material being between the more dense fraction and the less dense fraction and in contact with the penetrable means, (e) then while continuing to revolve the container system around the axis of revolution initiating movement of particulate material and less dense fraction out of the first compartment through the conduit means into the synchronously revolving second compartment by causing the conduit means to penetrate the penetrable means to place one opening of the conduit means in communication with the particulate material while holding the other opening of the conduit means in communication with the interior of the second compartment, (f) terminating movement of liquid fraction out of the first compartment to retain more dense fraction in the first compartment, (g) then disconnecting the first and second compartments and immobilizing the first compartment and revolving the second compartment to separate and deposite said particulate material against a wall of the second compartment remote from the axis of revolution, and (h) withdrawing less dense fraction minus said deposited particulate material from the second compartment.

References Cited by the Examiner

UNITED STATES PATENTS 338,966  3/86  Hedges _____ 233—26 X (Other references on following page)

UNITED STATES PATENTS

| | | | |
|---|---|---|---|
| 622,712 | 4/99 | Rissmuller | 233—27 |
| 1,296,399 | 3/19 | Johansson | 233—27 |
| 2,362,025 | 11/44 | Price | 128—214 |
| 2,367,338 | 1/45 | Crewdson | 57—76 X |
| 2,461,674 | 2/49 | Aronson | 233—28 |
| 2,496,258 | 2/50 | Alexander | 222—83 X |
| 2,678,159 | 5/54 | Ellis | 233—27 X |
| 2,702,034 | 2/55 | Walter. | |
| 2,822,126 | 2/58 | Cohn | 233—46 X |
| 2,848,995 | 8/58 | Ryan | 128—214 |
| 2,906,451 | 9/59 | Tullis et al. | 233—27 |
| 3,064,647 | 11/62 | Earl. | |

FOREIGN PATENTS

| | | |
|---|---|---|
| 979,279 | 12/50 | France. |
| 272,034 | 2/30 | Italy. |

HARRY B. THORTON, *Primary Examiner.*

ROBERT F. BURNETT, *Examiner.*